(12) United States Patent
Bouvier et al.

(10) Patent No.: US 7,429,859 B2
(45) Date of Patent: *Sep. 30, 2008

(54) DEVICE FOR PUNCTUAL MEASUREMENT OF A RADIOFREQUENCY MAGNETIC FIELD WITH CONSTANT AMPLITUDE AND FREQUENCY

(75) Inventors: Jacky Bouvier, Meylan (FR); Philippe Geoffroy, Fontaine (FR)

(73) Assignee: Fahrenheit Thermoscope LLC, Las Vegas, NV (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/380,756

(22) PCT Filed: Sep. 18, 2001

(86) PCT No.: PCT/FR01/02897

§ 371 (c)(1),
(2), (4) Date: Apr. 4, 2003

(87) PCT Pub. No.: WO02/25295

PCT Pub. Date: Mar. 28, 2002

(65) Prior Publication Data

US 2003/0184288 A1    Oct. 2, 2003

(30) Foreign Application Priority Data

Sep. 19, 2000 (FR) .................................. 00 11923

(51) Int. Cl.
*G01R 33/00* (2006.01)
*G01R 33/02* (2006.01)
*G06K 7/00* (2006.01)
*G06K 7/08* (2006.01)

(52) U.S. Cl. .............. 324/260; 324/244; 235/440; 235/450

(58) Field of Classification Search ................. 324/244, 324/247, 256, 258, 260, 261, 262; 340/572.1, 340/10.1; 235/438, 436, 439, 440, 449, 450
See application file for complete search history.

(56) References Cited

U.S. PATENT DOCUMENTS 4,267,522 A * 5/1981 Periot .......................... 331/65

(Continued)

FOREIGN PATENT DOCUMENTS

GB    2 154 328 A    9/1985

(Continued)

OTHER PUBLICATIONS

Bouvier et al., A Smart Card CMOS Circuit with Magnetic Power and Communications Interface, IEEE International Sold-State Circuits Conference, 1997, Session 17, Paper SA 17.6, pp. 296, 297, and 474.*

(Continued)

*Primary Examiner*—Patrick Assouad
*Assistant Examiner*—David M. Schindler

(57) ABSTRACT

The invention concerns a device for measuring a radiofrequency magnetic field, characterised in that it comprises on a common support (10): a coil forming a primary reception antenna; a voltage-controlled oscillator, monitored so that its output frequency depends on the amplitude of the magnetic field received on the coil forming primary antenna; an absorption modulation load connected to the oscillator output; a secondary antenna (22) sensitive to the magnetic field influenced by the absorption modulation resulting from the power supply load by the voltage-controlled oscillator, and means (30) for operating the available signal on the secondary antenna (22).

26 Claims, 2 Drawing Sheets

U.S. PATENT DOCUMENTS

| | | | | |
|---|---|---|---|---|
| 4,887,033 A | * | 12/1989 | Langdon et al. | 324/253 |
| 5,070,485 A | * | 12/1991 | Nyce | 367/127 |
| 5,546,445 A | | 8/1996 | Dennison et al. | |
| 5,592,086 A | * | 1/1997 | Weinstock et al. | 324/318 |
| 5,841,123 A | * | 11/1998 | Thorigne et al. | 235/492 |
| 6,329,808 B1 | * | 12/2001 | Enguent | 324/76.77 |
| 6,528,989 B1 | * | 3/2003 | Hansen | 324/207.12 |
| 6,703,941 B1 | * | 3/2004 | Blaker | 340/825.69 |
| 6,837,438 B1 | * | 1/2005 | Takasugi et al. | 235/492 |
| 6,963,372 B1 | * | 11/2005 | Hiyama et al. | 348/302 |
| 2007/0126423 A1 | * | 6/2007 | Bouvier et al. | 324/260 |

FOREIGN PATENT DOCUMENTS

| | | |
|---|---|---|
| WO | 0025454 | 5/2000 |

OTHER PUBLICATIONS

Patent Abstracts of Japan, vol. 013, No. 306, Jul. 13, 1989, JP 01-080872, Aisin Seiki Co., Ltd., Mar. 27, 1989, Abstract.

* cited by examiner

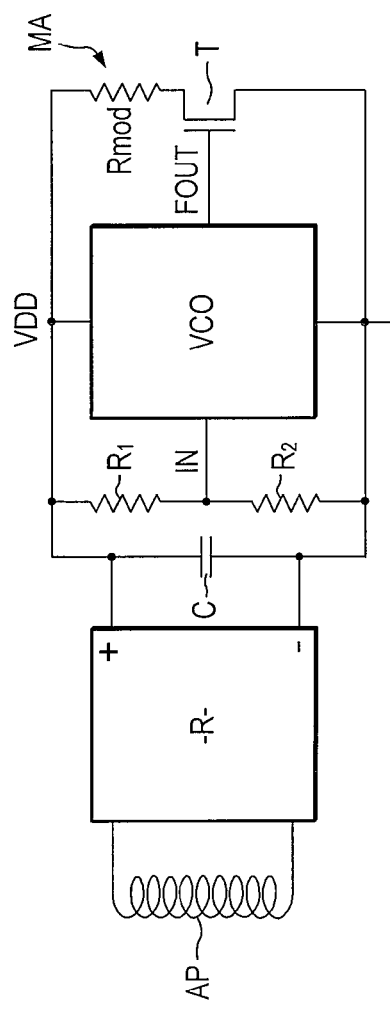
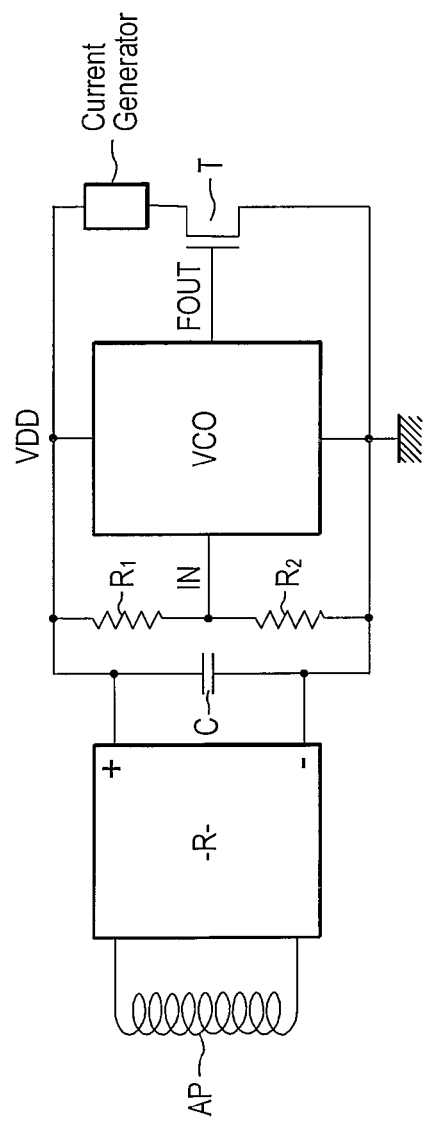
Fig. 2
Fig. 3

DEVICE FOR PUNCTUAL MEASUREMENT OF A RADIOFREQUENCY MAGNETIC FIELD WITH CONSTANT AMPLITUDE AND FREQUENCY

BACKGROUND OF THE INVENTION

This invention relates to the field of measuring a magnetic field.

SUMMARY OF THE INVENTION

More precisely, this invention relates to a device for punctual measurement of a radiofrequency magnetic field with constant amplitude and frequency.

This invention is particularly but not exclusively applicable to contact-free card readers and particularly to readers for components with integrated coils.

The purpose of this invention is to propose a device capable of measuring the magnetic field generated by devices such as contact-free card readers, and particularly for systems with fields of about $10^{-3}$ Tesla.

To the best knowledge of the inventor, no device planned at the moment is fully satisfactory for this type of application.

The above-mentioned purpose is achieved within the scope of this invention by means of a device for measuring the radiofrequency magnetic field characterized by the fact that it comprises the following, on a common support:

a coil forming a primary reception antenna, a voltage controlled oscillator, monitored so that its output frequency depends on the amplitude of the magnetic field received on the coil forming the primary antenna;

an absorption modulation load;

a secondary antenna sensitive to the magnetic field influenced by the absorption modulation resulting from the power supply to the absorption modulation load as controlled by the voltage controlled oscillator, and circuitry for using the available signal on the secondary antenna.

According to another advantageous characteristic of the invention, the support consists of a card made of non-magnetic material.

According to another advantageous characteristic of this invention, the device comprises a chip integrated on the support that includes the primary antenna, the voltage controlled oscillator and the absorption modulation load.

Other characteristics, purposes and advantages will become clear after reading the following detailed description with reference to the attached drawings given as a non-limitative example.

BRIEF DESCRIPTION OF THE DRAWING

FIG. 2 shows a detailed view of the assembly formed by the primary antenna, the voltage controlled oscillator and the modulation load.

DETAILED DESCRIPTION OF SOME OF THE EMBODIMENTS

Figure 1:
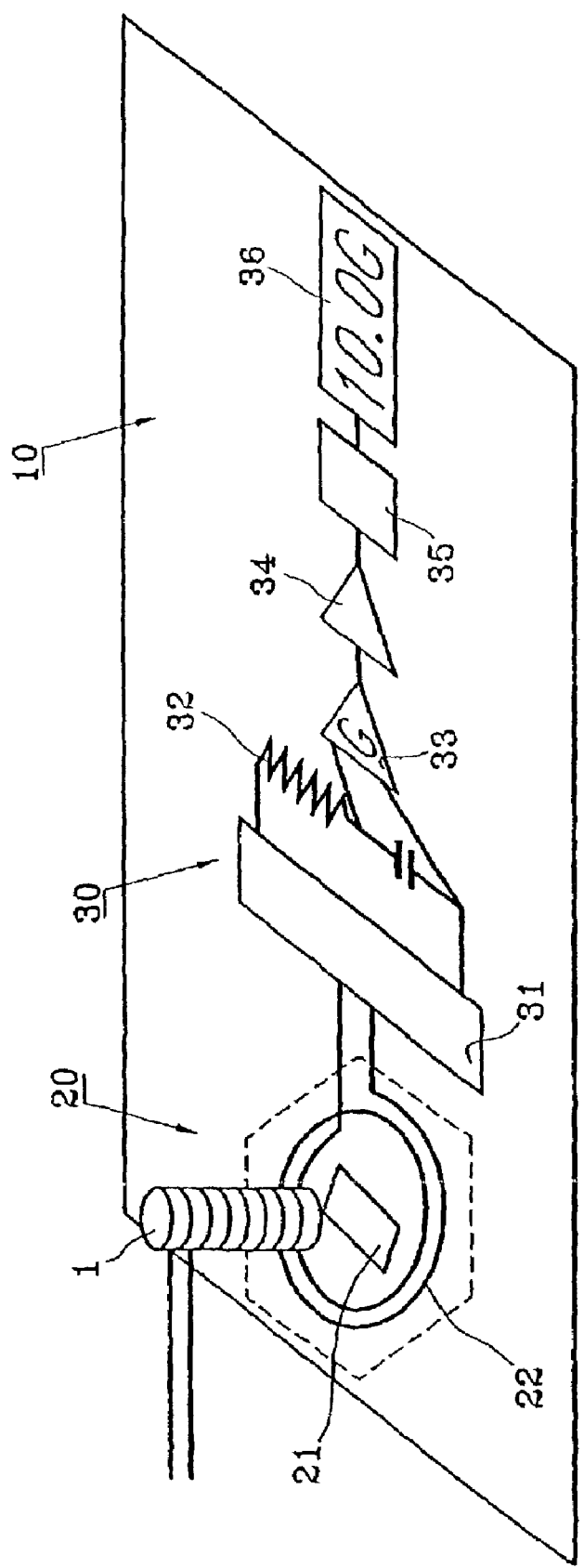
FIG. 1 diagrammatically shows a device according to this invention.

FIG. 1 diagrammatically shows the induction coil 1 of a contact-free card reader and a card forming a support 10, made of a non-magnetic material carrying all components used in the measurement deive according to this invention.

Typically, but not limitatively, the induction coil 1 is adapted to emit a radiofrequency magnetic field with an amplitude of about $10^{-3}$ Tesla at a frequency of 13.56 MHz.

Typically, but not limitatively, the dimensions of the card are 55×85 mm.

The device according to this invention, for which the structure will be described in more detail later, comprises a small sensor 20 inserted in the magnetic field of the induction coil 1 that is capable of transmitting information about the captured energy to the exterior, and circuitry 30 for processing this information, to amplify, to calculate the value of the magnetic field at the precise location at which the said sensor 20 is located, and to display it as a direct readout on a display unit 36.

The sensor 20 is composed of:

firstly, a small electronic chip 21 (for example 1.4 mm side dimension) comprising an integrated coil forming a primary reception antenna AP, a VCO or voltage controlled oscillator, the frequency of which depends on the magnetic field in which the chip 21 is located, and an absorption modulation device MA to transmit frequency information from the said VCO to the exterior;

secondly, an antenna 22 composed of a few turns, for example 2 turns, of an electrical conductor wound tightly around the electronic chip 21 forming a secondary antenna.

Preferably, the absorption modulation device MA is formed from a resistance Rmod connected to the output from the voltage controlled oscillator. Furthermore, this voltage-controlled oscillator is preferably adapted to emit a signal with a frequency of between about 500 and 15000 Hz.

The magnetic field/frequency transfer function of the voltage-controlled oscillator is preferably calibrated in the laboratory.

Circuitry 30 is connected to the output from the secondary antenna 22. Thus, circuitry 30 receives a signal for which the basic frequency corresponds to the induction coil emission frequency and for which the amplitude is modulated at the same rate as the frequency generated by the voltage controlled oscillator, this frequency being representative of the amplitude of the magnetic field received on the chip 21.

There are several possible variants of circuitry 30 for using the signal available on the secondary antenna 22.

According to the particular but non-limitative embodiment illustrated in FIG. 1, circuitry 30 comprises:

an amplitude demodulator 31 connected to the output from sensor 20, more precisely to the output from the secondary coil 22, the said demodulator 31 outputs frequency information at a low level of the order of a few millivolts, an RC 32 filter connected to the output from the demodulator 31;

an amplifier assembly 33 connected to the output from filter 32, with a sufficient gain to trigger a comparator system 34 providing a logical level frequency output signal compatible with processing means 35 preferably using a standard microcontroller, for example such as Motorola's MC68HC11 microcontroller.

This microcontroller 35 is programmed such that it calculates the value of the quasi punctual magnetic field available on chip 21, starting from the frequency information and using the transfer function mentioned above.

The program of the microcontroller 35 also manages the display of the value of the magnetic field, preferably calculated in gauss, in real time on a display 36. This display is preferably a liquid crystal display and is integrated on the support 10. However, if required, the display may be placed elsewhere on a module external to the support 10.

This invention may be used for applications in the field of measuring radiofrequency magnetic fields with constant amplitude and frequency, and particularly the adjustment of induction coils 1 used on very close contact-free card readers.

FIG. 2 illustrates an example of one embodiment of the chip 21 that includes the primary antenna AP, the voltage controlled oscillator VCO and the absorption modulation device MA.

In this example, the alternating voltage available at the output from the primary antenna AP is rectified by a rectifier R and filtered by a capacitor C to output a DC voltage VDD. This voltage is input to the voltage-controlled oscillator VCO and controls the VCO through a resistive divider bridge R1/R2 powered by VDD. The modulation resistance Rmod is placed in series with the main conduction path of a switching transistor T at the terminals of the power supply VDD. The transistor T is controlled through the output from the VCO.

The DC current that passes through the modulation resistance Rmod is chopped at the same frequency as the VCO, which depends on the amplitude of the field received on the primary antenna AP. The alternating current at 13.56 MHz that passes through the primary antenna AP is modulated accordingly.

The primary antenna AP and secondary antenna 22 are closely coupled, this current induces an electromotive force (EMF) in the secondary antenna 22. This EMF is additional to the EMF induced by the induction coil 1 of the reader.

Therefore, the resulting EMF is an alternating voltage at 13.56 MHz slightly modulated in amplitude at the frequency of the VCO.

The modulation resistance Rmod must be sufficiently low to generate a current providing a detectable EMF, but it must not be too low to avoid degrading the retrieved DC voltage supplying power to the VCO. For example it can be 20 KΩ.

Obviously, this invention is not limited to the particular embodiment that has just been described, but includes any variant conform with its spirit.

Any device capable of consuming electrical power can be used for modulation. For example, the resistance could be replaced by a current generator.

The invention claimed is:

1. A device, comprising:
    a support, wherein the support carries:
        at least one coil;
        a voltage controlled oscillator having an output frequency that depends on an amplitude of a magnetic field at the at least one coil;
        an absorption modulation load, wherein current through the absorption modulation load is chopped at the output frequency of the voltage controlled oscillator which results in modulating current in the at least one coil; and
        an antenna coupled to the at least one coil, wherein the antenna provides an output voltage alternating at a frequency of the magnetic field and modulated in amplitude at the output frequency of the voltage controlled oscillator.

2. The device according to claim 1, wherein the coil, the voltage controlled oscillator, and the absorption modulation load are located on a chip.

3. The device according to claim 1, further comprising circuitry for determining a value of the magnetic field from an output voltage of the antenna.

4. The device according to claim 1, wherein the absorption modulation load includes a resistance.

5. The device according to claim 1, wherein the antenna comprises two or more turns of an electrical conductor wound collectively around the coil, the voltage controlled oscillator, and the absorption modulation load.

6. The device according to claim 3, wherein the circuitry comprises a demodulator connected to the output from the antenna.

7. The device according to claim 6, comprising a filter at the output from the demodulator.

8. The device according to claim 3, wherein the circuitry comprises a high gain amplifier adapted to trigger a comparator system outputting a logical level frequency output signal.

9. The device according to claim 3, wherein the circuitry comprises a microcontroller programmed to calculate a value of the magnetic field based on processed output from the antenna.

10. The device according to claim 1, wherein the coil inputs to a rectifier that outputs a DC voltage that:
    supplies power to and controls the voltage controlled oscillator; and
    supplies power to the modulation load which is connected in series with a switching transistor controlled through the output from the voltage controlled oscillator.

11. The device according to claim 1, wherein the support is made of non-magnetic material.

12. The device of claim 3, further comprising a display unit for displaying the value of the magnetic field.

13. The device of claim 1, wherein the device measures a radiofrequency magnetic field having constant amplitude and frequency.

14. The device of claim 13, wherein the magnetic field has a strength of about $10^{-3}$ Tesla.

15. A method of using a device for determining a value of a magnetic field, the method comprising:
    said device rectifying an alternating voltage output from at least one coil in an alternating magnetic field;
    said device controlling a voltage controlled oscillator using the rectified voltage;
    said device outputting a signal from the voltage controlled oscillator, wherein the signal has a frequency that depends on an amplitude of the magnetic field at the at least one coil;
    said device chopping current in a modulation resistance connected between the rectified voltage and a switching device that receives the signal from the voltage controlled oscillator, wherein current through a modulation resistance is chopped at the frequency of the signal from the voltage controlled oscillator which results in modulating current in the at least one coil; and
    said device determining a value of the magnetic field by demodulating an output voltage of an antenna coupled to the at least one coil, wherein the output voltage alternates at a frequency of the magnetic field and is modulated in amplitude at the frequency of the signal from the voltage controlled oscillator.

16. The method of claim 15, wherein said determining further comprises filtering the demodulated output voltage.

17. The method of claim 16, wherein said determining further comprises amplifying the filtered, demodulated output voltage with a high gain amplifier.

18. The method of claim 17, wherein said determining further comprises calculating the value for the magnetic field based on the amplified, filtered, demodulated output voltage.

19. The method of claim 15, further comprising displaying the determined value of the magnetic field.

20. A device comprising:
    a sensor comprising:

a coil;
   a voltage controlled oscillator having an output frequency that depends on an amplitude of a magnetic field at the coil; and
   an absorption modulation load, wherein current through the absorption modulation load is generated by a voltage induced in the coil by the magnetic field, and wherein the current is chopped at the output frequency of the voltage controlled oscillator; and
   an antenna, wherein the antenna comprises a plurality of turns of an electrical conductor wound around the sensor.

21. The device of claim 20, wherein the antenna provides an output voltage alternating at a frequency of the magnetic field and modulated in amplitude at the output frequency of the voltage controlled oscillator.

22. A device made by a method comprising:
   populating a chip with at least a coil, a voltage controlled oscillator, and an absorption modulation load, wherein the voltage controlled oscillator has an output frequency that depends on an amplitude of a magnetic field at the coil, and current through the absorption modulation load is generated by a voltage induced in the coil by the magnetic field, and wherein the current is chopped at the output frequency of the voltage controlled oscillator; and
   forming an antenna by winding a plurality of turns of an electrical conductor around the chip.

23. The device of claim 22, wherein the method further comprises populating a support with at least the antenna wound around the chip and circuitry for determining a value of the magnetic field from a voltage induced in the antenna.

24. The device of claim 23, wherein the method further comprises implementing a display on the support to display the value of the magnetic field.

25. A device, comprising:
at least one coil;
a voltage controlled oscillator having an output frequency that depends on an amplitude of a magnetic field at the at least one coil;
an absorption modulation load, wherein current through the absorption modulation load is chopped at the output frequency of the voltage controlled oscillator which results in modulating current in the at least one coil; and
an antenna coupled to the at least one coil, wherein the antenna provides an output voltage alternating at a frequency of the magnetic field and modulated in amplitude at the output frequency of the voltage controlled oscillator;
wherein the magnetic field is emitted by a second coil.

26. A device, comprising:
at least one coil;
a voltage controlled oscillator having an output frequency that depends on an amplitude of a magnetic field at the at least one coil;
an absorption modulation load, wherein current through the absorption modulation load is chopped at the output frequency of the voltage controlled oscillator which results in modulating current in the at least one coil; and
an antenna coupled to the at least one coil, wherein the antenna provides an output voltage alternating at a frequency of the magnetic field and modulated in amplitude at the output frequency of the voltage controlled oscillator;
wherein the antenna surrounds the at least one coil, the voltage controlled oscillator and the absorption modulation load.

* * * * *